Figure 1:
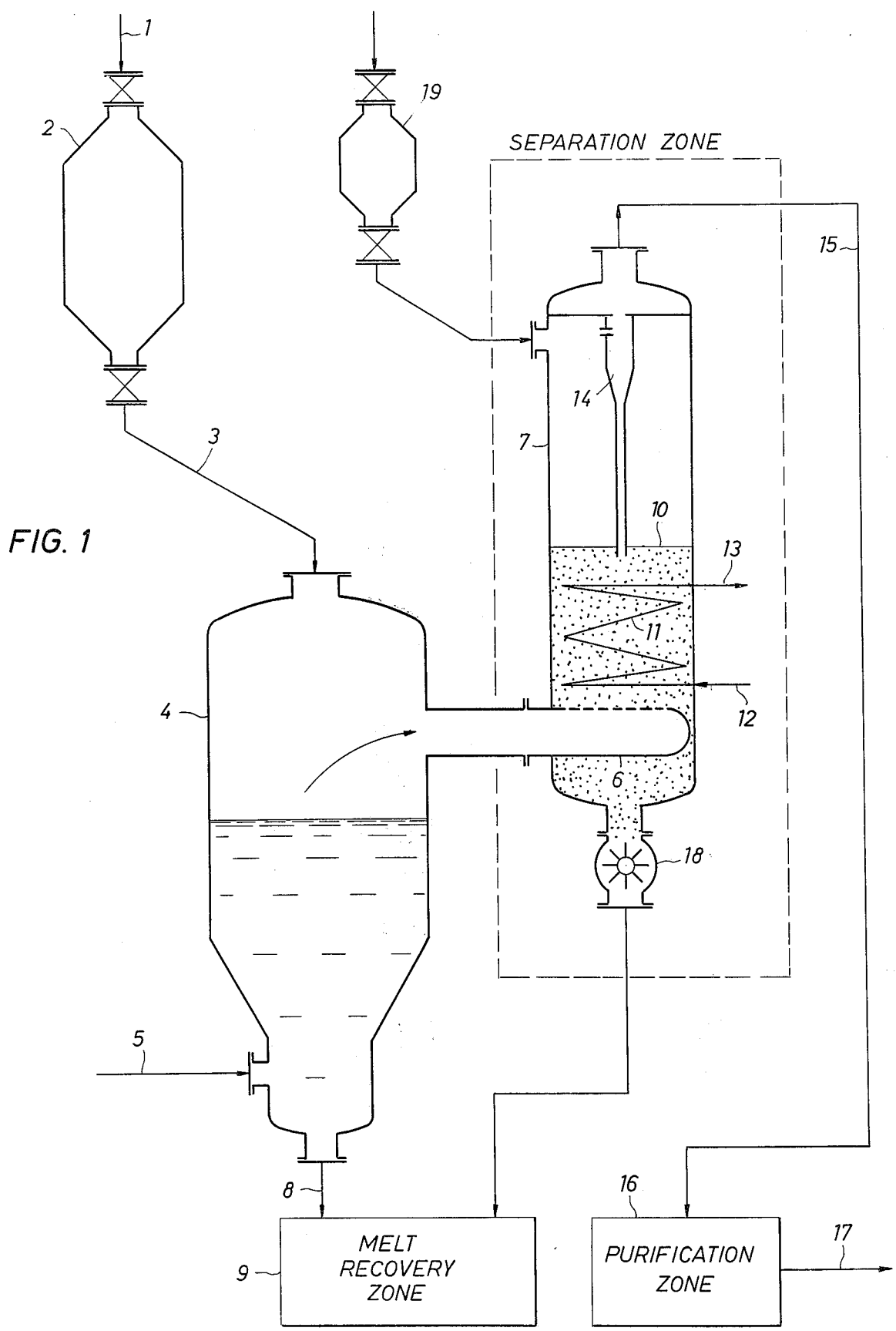

United States Patent [19]

Fraley

[11] 4,120,668

[45] Oct. 17, 1978

[54] METHOD FOR REMOVING ENTRAINED MELT FROM A GASEOUS STREAM

[75] Inventor: Lowell David Fraley, Sugarland, Tex.

[73] Assignee: Pullman Incorporated, Chicago, Ill.

[21] Appl. No.: 797,264

[22] Filed: May 16, 1977

Related U.S. Application Data

[63] Continuation-in-part of Ser. No. 698,236, Jun. 21, 1976, abandoned.

[51] Int. Cl.² .................................................. B01D 49/00
[52] U.S. Cl. ......................................... 55/72; 55/82; 55/269; 55/474
[58] Field of Search ................. 55/72, 74, 77, 79, 80, 55/82, 99, 269, 474, 512; 423/210.5; 427/213

[56] References Cited

U.S. PATENT DOCUMENTS

| | | | |
|---|---|---|---|
| 2,391,334 | 12/1945 | Nicholson | 55/79 |
| 2,439,811 | 4/1948 | Jewell | 55/79 |
| 2,493,911 | 1/1950 | Brandt | 55/79 |
| 2,580,635 | 1/1952 | Winter, Jr. | 55/72 |
| 2,617,839 | 11/1952 | Moore et al. | 55/77 |
| 2,620,047 | 12/1952 | Cahn | 55/79 |
| 2,630,877 | 3/1953 | Berg | 55/79 |
| 2,682,930 | 7/1954 | Krchma | 55/72 |
| 2,726,137 | 12/1955 | Davis, Jr. | 55/79 |
| 3,007,545 | 11/1961 | Kimberlin, Jr. et al. | 55/79 |
| 3,247,014 | 4/1966 | Goldberger et al. | 427/213 |
| 3,276,186 | 10/1966 | Hronas et al. | 55/74 |
| 3,443,360 | 10/1967 | Reeves | 55/71 |
| 3,719,029 | 3/1973 | Suzukawa et al. | 55/91 |
| 3,755,161 | 8/1973 | Yokota et al. | 55/74 |
| 3,977,846 | 8/1976 | Russell et al. | 55/79 |

*Primary Examiner*—Frank W. Lutter
*Assistant Examiner*—David L. Lacey

[57] ABSTRACT

A process for removing entrained liquid and volatilized melt from a gaseous stream produced in molten salt processing wherein the gaseous stream is passed through fluidized, solid particulate material and entrained melt solidifies on the particulate material.

10 Claims, 2 Drawing Figures

METHOD FOR REMOVING ENTRAINED MELT FROM A GASEOUS STREAM

This application is a continuation-in-part of my co-pending application Ser. No. 698,236, filed June 21, 1976 entitled "Method for Removing Entrained Melt from a Gaseous Stream", now abandoned.

This invention relates to a process for the removal of entrained melt from a gaseous stream produced by molten salt processing of carbonaceous and hydrocarbonaceous materials.

A variety of molten salt conversion and treatment processes are known. These processes include conversion of liquid and solid carbonaceous and hydrocarbonaceous materials to more useful products such as, for example, hydrogen, methane, carbon monoxide, petroleum distillates, and olefins; incineration of waste materials; fuel cell applications; heat transfer; and sulfur dioxide removal from waste gases. The molten salt compounds employed in these processes similarly cover a broad range and include, for example, alkali metal carbonates and hydroxides as well as zinc halides. Depending on the particular process being used, binary or tertiary mixtures may be utilized. For example, a sodium-potassium-lithium carbonate eutectic mixture is particularly suitable for producing petroleum distillates and olefins from crude oil or heavy petroleum fractions. Again depending on the particular process being used, other compounds such as sodium sulfide and sulfate, ash, and reaction promoters may be present in the molten salt melt.

Since most molten salt processes involve liquid-gas reactions or treatments, some melt components are generally entrained in the gaseous stream from the molten salt processing zone despite the exercise of good design practice. These may be volatilized melt components, for example, alkali metal oxides, as well as liquid components of the melt. Accordingly, the term entrained melt as hereinafter used refers to volatilized as well as liquid melt or melt components. In many instances, use of a wire mesh or chevron entrainment separator will suffice to remove much of the liquid melt entrained in the gaseous stream. Volatile melt compounds, however, pass through these devices without removal. A particularly critical problem is presented when combustible gas streams are produced in alkali metal carbonate melts for use in gas turbines. These turbines must operate on a gaseous stream that is completely free of alkali compounds. A known means of cleaning gases produced from a water soluble melt is through use of a water spray quench tower. This method is effective with respect to stringent turbine requirements, however, it suffers the disadvantage of loss of valuable heat present in the gaseous stream leaving the molten salt gasification zone.

An object of this invention, therefore, is to provide a process for the removal of entrained melt from a gaseous stream. A further object is to remove entrained melt from a gaseous stream with concurrent recovery of waste heat from the gases. A more particular object is to provide a process for cleaning combustible gas produced in a molten salt gasification zone that can be subsequently adjusted in composition and purified for use in a gas turbine.

Other objects and advantages of the invention will be apparent to those skilled in the art from the following description.

According to the invention, a process is provided for the removal of entrained melt from a gaseous stream by contacting the stream in a separation zone with solid, particulate material maintained in a fluidized state by upward flow of the gaseous stream. The fluidized particles are maintained at a temperature sufficiently below the temperature of entrained melt to cause entrainment to solidify on the solid, particulate material. Coated particles are continuously or periodically purged from the separation zone. In a preferred embodiment of the invention, the fluidized particle temperature is maintained below the entrained melt temperature by immersion of indirect heat exchange means in the fluidized particles which provides the additional benefit of waste heat recovery from the gaseous stream as well as fast quenching to stabilize gas composition.

The gaseous stream treated by the process of this invention can be any gas or gaseous mixture including vaporized normally liquid hydrocarbons produced or treated in a molten salt processing zone, for example, hydrogen, methane, carbon monoxide, carbon dioxide, nitrogen, petroleum distillates, olefins, nitrogen and hydrogen sulfide. The pressure at which the gaseous stream is produced will be dictated primarily by the desired products and design economics and will generally range from about 10 psig. to about 2000 psig. The entrained melt separation zone containing the fluidized, solid, particulate material is preferably operated at the same pressure as the melt processing zone with suitable allowance for pressure drop in the system. Pressure in the separation zone is not critical as long as the gaseous stream is available in sufficiency to fluidize the solid, particulate material in the separation zone. The temperature of the gaseous stream containing entrained melt will similarly correspond closely with that of the molten salt processing zone and will range from about 750° F. to about 2000° F. or the upper temperature limit for materials of construction employed in the melt processing zone.

The solid, particulate material which is fluidized by the gaseous stream can be any fluidizable material which is heat-resistant at the operating temperature employed within the separation zone and may be chemically reactive with either components of the gaseous stream or the melt to the extent that the particulate material is not physically decomposed. For example, sodium oxide entrained in the gaseous stream will solidify on sand used as the fluidized material to form a coating of sodium silicate. In general, commonly available, low cost materials are preferred for use as solid, particulate material. These include, for example, sand, alumina, zeolite, glasses, ash, calcined or uncalcined limestone and dolomite, as well as mixtures of these materials. In one embodiment of the invention a dense phase, stationary bed is fluidized by the gaseous stream passing upwardly through the bed at superficial velocities of from about 0.1 feet per second to about 8.0 feet per second. A suitable fluid bed material in this instance has a size range of from about 20 microns to about 500 microns.

In another embodiment of the invention a dilute phase, circulating, fluidized system is employed and the gaseous stream passes upwardly and laterally through the system at superficial velocities of from about 5 feet per second to about 70 feet per second. The particulate material should be within the size range stated above. Specific choices of fluidization conditions can readily be made by those familiar with fluid bed operations.

The fluidized particles must be maintained at a temperature below the melting point of melt components or their reaction products with the particles, e.g., alkali metal silicates or aluminates. Therefore, when the gaseous stream is at a temperature of from about 750° F. to about 2000° F., the separation zone should be maintained at a lower temperature of from about 300° F. to about 1700° F. Since it is economically desirable to recover waste heat from the gaseous stream in most molten salt processes, it is preferred to maintain the particle temperature at least 300° F. below the lowest melting point of the melt components to be removed and most preferably at a low temperature selected for maximum recovery of waste heat. Heat exchange tubes or coils immersed at least partly within the fluidized system are a suitable means of recovering such waste heat. The heat exchange medium may be boiler feed water to produce saturated or superheated steam or other process streams.

In operation of the separation zone, entrained melt of the compositions previously described solidify upon the fluidized solid, particulate material thereby coating these particles with melt components. Solidification will commonly occur by freezing but may also occur by deposition of reaction products of the entrained melt components and the solid particles. Coating build-up on the particles is not particularly detrimental to operation of the separtion zone except when the coating effectively increases the particle size beyond the desired range. In order to maintain desired characteristics of the fluidized system, a purge stream is periodically or continuously withdrawn and an equivalent amount of clean, solid, particulate material is added to the separation zone. While the purge stream may be discarded, it will generally be found desirable to pass the purge stream to a melt recovery zone operated in conjunction with the molten salt processing zone. In the recovery zone, melt can be recovered by water solution techniques known in the art and recovered melt recycled to the melt processing zone.

Alternatively, the purge stream may be injected directly into the melt processing zone where particulate material is discharged with fuel residues such as ash.

The invention is more fully illustrated in the drawings of which

Figure 2:
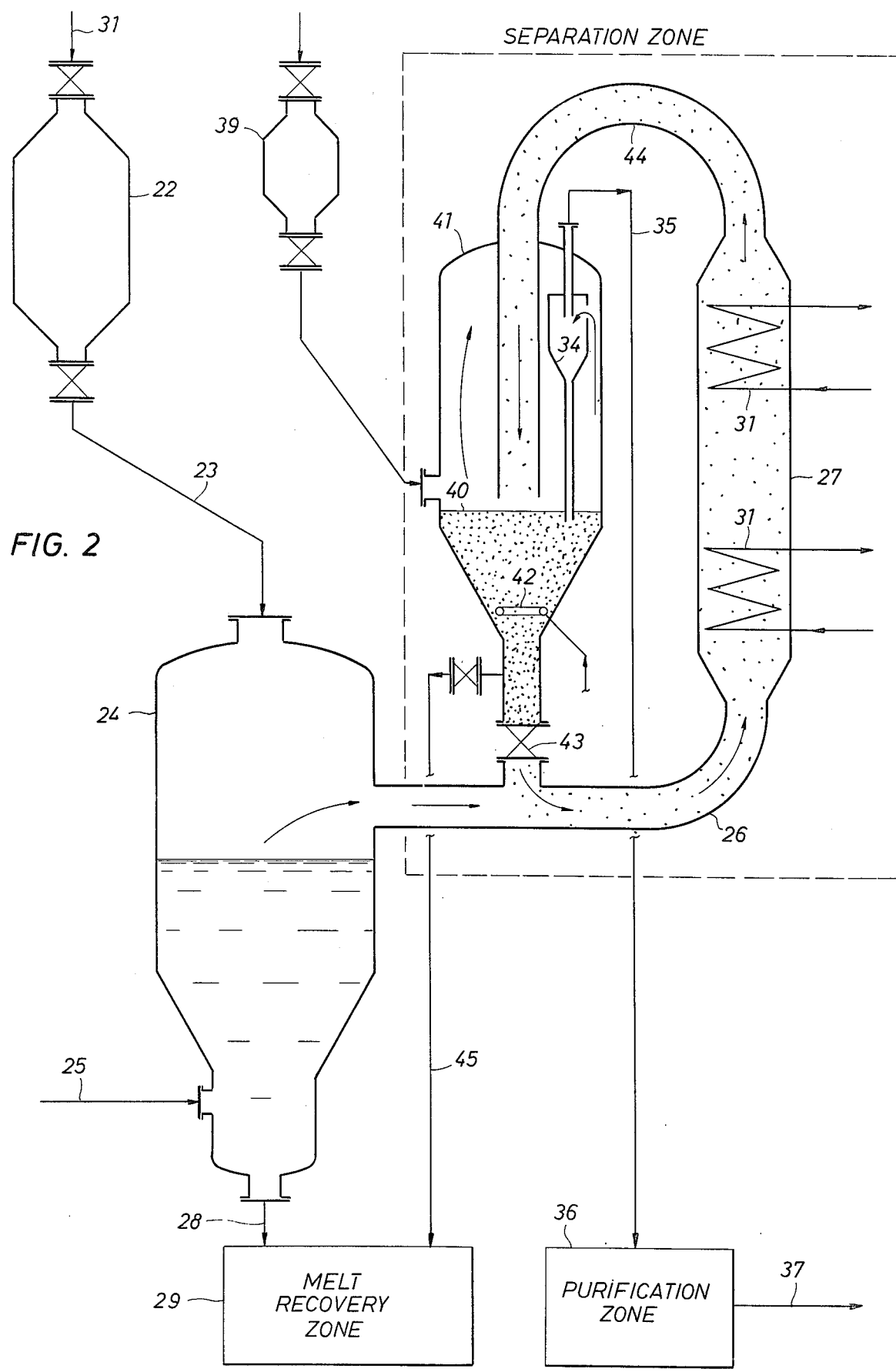

FIG. 1 describes an embodiment utilizing a dense phase, stationary fluid bed and FIG. 2 describes an embodiment which utilizes a dilute phase, fluidized system in the form of a circulating bed.

Referring to FIG. 1, crushed, washed coal is mixed with sodium carbonate and introduced via line 1 to feed lock hopper 2 and is subsequently charged batch-wise via line 3 to refractory-lined gasifier 4 containing sodium carbonate melt together with ash, sodium hydroxide, sodium sulfide and unreacted carbon. Substantially pure oxygen is introduced to the gasifier via line 5 which reacts with coal in the melt to produce a gaseous stream that is passed via a diffuser inlet 6 to refractory-lined vessel 7 within the separation zone. A mixture of ash and melt is purged 8 from gasifier 4 to a melt recovery zone 9 where sodium carbonate is recovered for recycle to feed lock hopper 2.

The gaseous stream is composed predominately of methane, hydrogen, carbon monoxide, carbon dioxide, and water vapor and flows to vessel 7 at the rate of 120,000 pound-mols/hour, pressure of 1200 psia. and temperature of 1700° F. A stationary, sand bed 10 disposed in the lower portion of vessel 7 has a cross-sectional area of 260 sq. ft. and an active height in the fluidized state of 10 ft. The sand bed is maintained in a dense phase, fluidized state by upward passage of the gaseous stream at a superficial velocity of 2.5 fps.

The fluid bed 10 is composed predominately of sand particles having a mean size of 80 microns and is maintained at a temperature of 1200° F. by cooling coils 11 immersed in the fluid bed. $2.25 \times 10^6$ lbs. per hour of steam at a pressure of 1250 psia. and temperature of 572° F. is introduced to the cooling coils via line 12 and is superheated to a temperature of 950° F. Superheated steam leaving 13 the cooling coils is utilized in turbine drives for compression and pumping requirements of the gasification process.

In operation of the separation zone, melt components such as sodium carbonate, sodium oxide, and other entrained or volatile sodium compounds in the gaseous stream entering via diffuser-inlet 6 impinge and solidify upon the fluidized sand particles. The gaseous stream along with some newly entrained, coated, sand particles passes to cyclone separator 14 disposed in the upper portion of vessel 7. Coated sand particles are returned from the cyclone separator to the fluid bed 10 via a dipleg and a cleaned gaseous stream leaves then cyclone and, subsequently, the separation zone via line 15. The cleaned gaseous stream is then passed to purification zone 16 for shift conversion, carbon dioxide removal, sulfur removal, methanation and is finally discharged as product gas at 17.

Referring back to the separation zone, sand particles coated with melt components are continuously removed from the separation zone at the bottom of vessel 7 via rotary feeder 18 at the rate of 9000 lbs. per hour and discharged to melt recovery zone 9 where additional sodium carbonate is recovered for recycle. In compensation for this loss of sand from the system, an equivalent amount of clean sand is added, via feed lock hopper 19, to the separation zone at the upper part of vessel 7.

Referring now to FIG. 2, the operation of equipment peripheral to the separation zone and identified with reference numerals 21, 22, 23, 24, 25, 28, 29, 36, 37 and 39 is substantially identical to the operation of this equipment depicted in FIG. 1 and respectively identified on FIG. 1 with reference numerals 1, 2, 3, 4, 5, 8, 9, 16, 17 and 19.

In FIG. 2, a gaseous stream composed predominantly of methane, hydrogen, carbon monoxide, carbon dioxide and water vapor exits gasifier 24 and flows via line 26 laterally and upwardly through vessel 27 within the separation zone.

A dense phase, stationary fluid bed 40 composed predominantly of sand particles having a mean size of 80 microns is maintained in disengagement vessel 41, This bed is fluidized by a small amount of compressed product gas introduced via sparging device 42. Sand particles flow from the bottom of disengagement vessel 41 through control valve 43 and are suspended in the gaseous stream flowing concurrently and through them within line 26 at a superficial velocity of 30 feet per second. Melt components contained in the gaseous stream impinge and solidify upon the sand particles suspended in the gaseous stream as they circulate through line 26, vessel 27, and return line 44 all within the separation zone. Temperature of suspended sand particles is maintained below the gaseous stream temperature by cooling coils 31 located within vessel 27.

The gaseous stream having coated, sand particles suspended therein passes from return line 44 to disengagement vessel 41 where the particles are removed from the dilute phase suspension by reduction in velocity of the gaseous stream and operation of cyclone 34. The cleaned gaseous stream is then passed to purification zone 36 for desulfurization and adjustment of composition as previously described.

Sand particles coated with solidified melt components are continuously removed from the separation zone at the lower portion of disengagement vessel 41 via line 45 and discharged to melt recovery zone 29 where additional sodium carbonate is recovered for recycle.

I claim:

1. A process for removal of entrained melt from a gaseous stream comprising:
   (a) maintaining solid, particulate material in a separation zone at a temperature below the temperature of the gaseous stream;
   (b) passing the gaseous stream containing entrained melt upwardly through the solid, particulate material at a sufficient velocity to fluidize the material;
   (c) solidifying the entrained melt on the fluidized, solid, particulate material in the separation zone by maintaining the solid particulate material at a temperature below the condensation temperature of the entrained melt to form coated particulate material;
   (d) removing at least a portion of the coated particulate material from the separation zone;
   (e) adding clean solid, particulate material to the separation zone; and
   (f) withdrawing a cleaned gaseous stream from the separation zone.

2. The process of claim 1 wherein the melt comprises an alkali metal carbonate.

3. The process of claim 2 wherein the melt comprises a eutectic mixture containing sodium carbonate, lithium carbonate, and potassium carbonate.

4. The process of claim 2 wherein the solid, particulate material is selected from the group consisting of sand, alumina, zeolite, glasses, limestone, dolomite, ash, or mixtures thereof.

5. The process of claim 1 wherein the fluidized, solid, particulate material is positioned in a dense phase, stationary bed and has a size range of from about 20 microns to about 500 microns and the fluidizing gaseous stream has a superficial velocity of from about 0.1 feet per second to about 8.0 feet per second.

6. The process of claim 1 wherein the fluidized, solid, particulate material is maintained in a dilute phase, circulating, fluidized system and has a size range of from about 20 microns to about 500 microns and the fluidizing gaseous stream has a superficial velocity of from about 5 feet per second to about 70 feet per second.

7. The process of claim 1 wherein the gaseous stream is at a temperature of from about 750° F. to about 2000° F. and the separation zone is maintained at a temperature of from about 300° F. to about 1700° F. and a pressure of from about 10 psig. to about 2000 psig.

8. The process of claim 1 wherein waste heat is recovered from the separation zone by indirect heat exchange with the fluidized, solid, particulate material.

9. The process of claim 1 wherein the gaseous stream contains hydrogen, methane, carbon monoxide, or mixtures thereof.

10. The process of claim 1 wherein the gaseous stream contains petroleum distillates and olefins.

* * * * *